United States Patent [19]

Nagaraj et al.

[11] Patent Number: 6,125,236

[45] Date of Patent: *Sep. 26, 2000

[54] METHOD AND APPARATUS FOR PROVIDING USER CONTROL OF MULTIMEDIA PARAMETERS

[75] Inventors: Rayi Nagaraj; Mark S. Shipman, both of Hillsboro, Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/568,734

[22] Filed: Dec. 5, 1995

[51] Int. Cl.[7] ..................................................... G06F 13/24
[52] U.S. Cl. ........................ 395/733; 712/220; 707/104; 345/326
[58] Field of Search .................................. 395/800, 500, 395/615, 326, 733

[56] References Cited

U.S. PATENT DOCUMENTS

| | | | |
|---|---|---|---|
| 5,208,745 | 5/1993 | Quentin et al. | 364/188 |
| 5,226,160 | 7/1993 | Waldron et al. | 395/500 |
| 5,517,652 | 5/1996 | Miyamoto et al. | 395/800 |
| 5,553,222 | 9/1996 | Miline et al. | 395/154 |
| 5,559,707 | 9/1996 | DeLorme et al. | 701/200 |
| 5,596,695 | 1/1997 | Hamada et al. | 395/333 |
| 5,625,845 | 4/1997 | Allran et al. | 395/800 |
| 5,684,997 | 11/1997 | Kou et al. | 395/733 |

*Primary Examiner*—Kevin J. Teska
*Assistant Examiner*—Kyle J. Choi
*Attorney, Agent, or Firm*—Blakely, Sokoloff, Taylor & Zafman LLP

[57] ABSTRACT

A computer system for providing user control of multimedia output parameters. The computer system includes a central processing unit (CPU) coupled to a memory unit. The memory unit includes a system management mode (SMM) memory and a main memory. The SMM memory is not mapped as part of the main memory and includes a prestored interrupt processing program. The interrupt processing program includes multimedia parameter control functions that provide a user with control of the output of multimedia parameters. The computer system further includes an input means for a user to generate multimedia parameter control requests, and an interrupt triggering means for detecting the multimedia parameter control request and in response issues an interrupt to the CPU. In response to the interrupt, the CPU interrupts execution, stores the current system state data of the computer system into the SMM memory, and starts execution of the interrupt processing program to service the multimedia parameter control functions.

14 Claims, 4 Drawing Sheets

METHOD AND APPARATUS FOR PROVIDING USER CONTROL OF MULTIMEDIA PARAMETERS

BACKGROUND OF THE INVENTION

1. Field of the Invention

The present invention relates to the field of computer systems. More specifically, the present invention relates to user interface control of multimedia output parameters.

2. Background Information

Multimedia operations are becoming a standard feature of personal computers. However, there remains a challenge of defining simple user interface control of audio and video output parameters. Prior methods of user interface control have been provided through software tools, implemented in the drivers of operating systems such as DOS, Windows, or UNIX. However, relying on software tools to provide user interface control places a large restriction on the versatility of the computer system. For example, if the operating system of the computer system is changed, the new operating system may not include compatible user control features. hI addition, a separate driver must be developed for the various operating systems.

An alternative to providing the user control through software is to utilize a hardware implementation by placing control buttons and knobs on the front panel of the computer and running wires from the panel to the mother board. However, this approach has the disadvantage that it is expensive because additional wiring is required to implement the system on existing motherboards, and further requires some modification of existing chassis. In addition, placing the control buttons on a front panel may not work well for computer systems in hard to reach locations.

Thus, it is desirable to provide a user interface control for multimedia parameters that is completely independent and transparent of operating systems, can be implemented on conventional motherboards without additional wiring, and easily within the reach of the user. As will be disclosed in more detail below, the method and apparatus of the present invention achieves these and other desirable results.

SUMMARY OF THE INVENTION

The present invention provides a novel method and apparatus for providing a user with control of multimedia output parameters through the use of transparent system interrupts. More specifically, the invention includes a computer system having a central processing unit (CPU) coupled to a memory unit that includes a system management mode (SMM) memory. The SMM memory is not mapped as part of the memory unit and includes a prestored interrupt processing program. The interrupt processing program includes multimedia parameter control functions that provide a user with control of the output of multimedia parameters. The computer system further includes an input means for a user to generate multimedia parameter control requests, and an interrupt triggering means for detecting the multimedia parameter control request and in response issuing a transparent interrupt to the CPU. In response to the transparent interrupt, the CPU interrupts execution of the operating system and any programs being processed, stores the current system state data of the computer system into the SMM memory, and starts execution of the interrupt processing program including the multimedia parameter control functions.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention.

Figure 1:
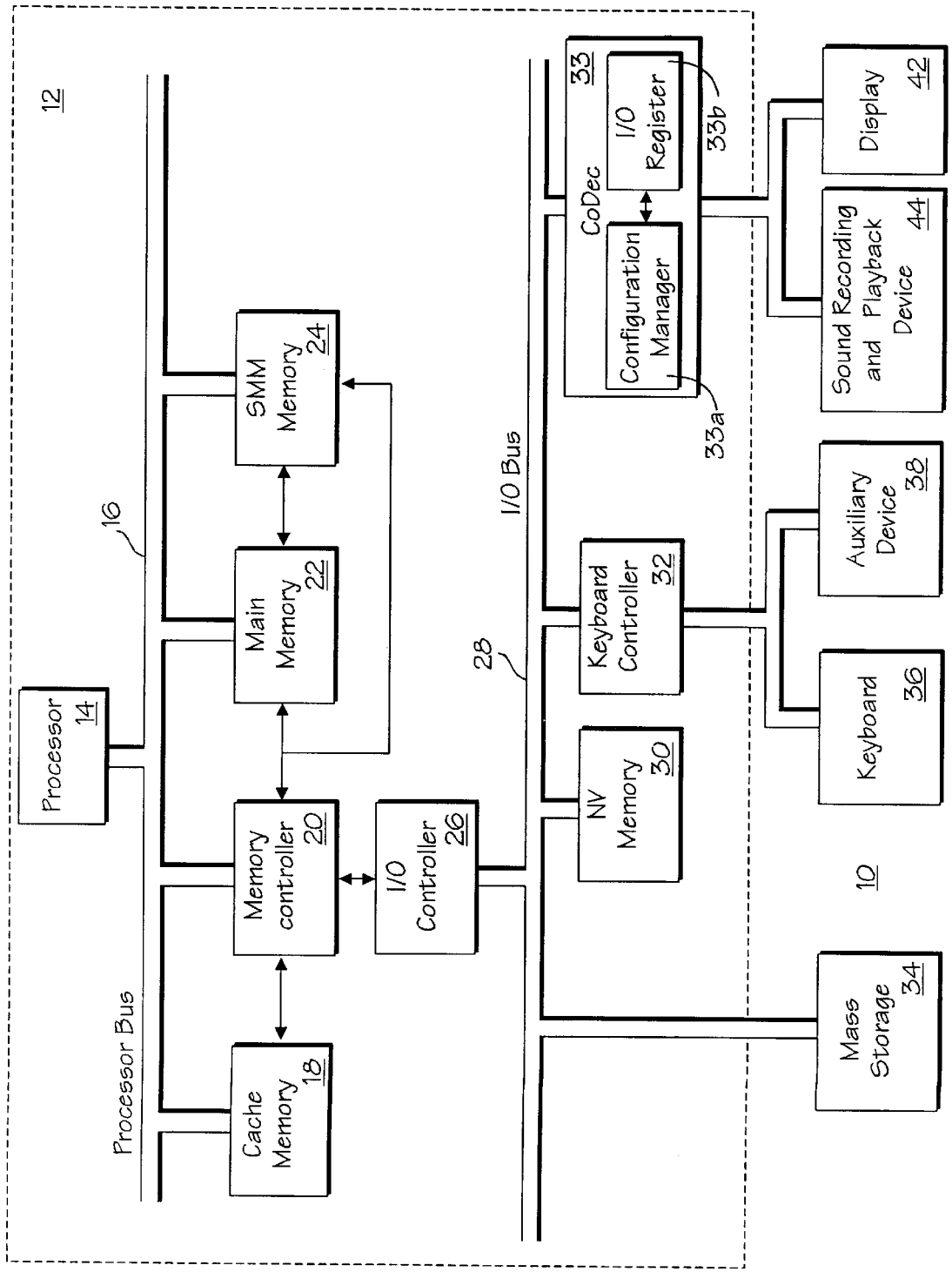
FIG. 1 illustrates an exemplary computer system incorporating the teachings of the present invention.

Referring now to FIG. 1, an exemplary computer system incorporating the teachings of the present invention is illustrated. Exemplary computer system 10 includes motherboard 12 incorporated with the teachings of the present invention, and external devices 34–44. Motherboard 12 includes processor 14, cache memory 18, main memory 22, SMM memory 24, memory controller 20, and processor bus 16 coupled to each other as shown. Additionally, motherboard 12 further includes input/output (I/O) controller 26, non-volatile (NV) memory 30, keyboard controller 32 incorporated with the teachings of the present invention, and I/O bus 28, coupled to each other and the earlier enumerated elements as shown. External devices 34–44 includes mass storage 34, keyboard 36 and auxiliary device 38 such as a mouse, a display 42, and a sound recorder and playback unit 44. Mass storage 34 is coupled to I/O bus 28 directly, while keyboard 36 and auxiliary device 38 are coupled to I/O bus 28 through keyboard controller 32. In addition, the display 42 and the sound recorder and playback unit 44 are coupled to the I/O bus 28 through the CoDec 33, which includes a configuration manager 33a and a I/O register file 33b. Other I/O devices (not shown) may also be coupled to I/O bus 28 through keyboard controller 32.

Processor 14 performs its conventional function of executing instructions of programs, including application programs, subsystem and operating systems. In particular, processor 14 includes circuitry for being interrupted by a system management interrupt (SMI), which is an interrupt unmaskable by the executing programs. Furthermore, the instruction set supported by processor 14 includes a Resume instruction for subsequently resuming execution of the interrupted programs following an interruption by the SMI. As will be described in more detail below, the interrupted programs resume execution as if they were never interrupted. During this period, from interruption to resumption, processor 14 is said to be executing in a system management mode (SMM). Particular examples of processor 14 include i486™ and Pentium® processors manufactured by Intel Corp. of Santa Clara, Calif., assignee of the present invention.

SMM memory 24 is used to store an SMI handler for servicing each SMI, and temporarily saving the processor state while servicing an SMI. SMI handler includes logic for handling SMI's triggered to provide user interface control of multimedia parameters in accordance with the present invention, which will be described in more detail below. Upon servicing an SMI, the SMI handler uses the Resume instruction to resume execution of the interrupted programs.

SMM memory 24 is normally not mapped as part of the main memory 22. SMM memory 24 is mapped into the main memory 22 only when an SMI needs to be serviced, and unmapped upon servicing the SMI. SMM memory 24 may be implemented with any number of random access memory (RAM) known in the art.

Memory controller 20 performs its conventional function of controlling accesses to the various memory units 18, 22, 24. In particular, memory controller 20 includes circuitry for dynamically mapping and unmapping SMM memory 24 into the main memory 22 under the control of processor 14. Memory controller 20 may also be implemented with any number of memory controllers known in the art.

With the exception of keyboard controller 32, all other elements perform their conventional functions. Their constitutions are well known and will not be otherwise described. However, the keyboard controller 32 and the above described user interface multimedia control functions provided through the SMI handler, will be described in more detail below with additional references to the remaining figures.

Before describing in detail the keyboard controller 32 and the multimedia parameter control functions provided to the SMI handler, it should be noted that while the present invention is being described with enumerated elements 14–33 disposed on a single circuit board or motherboard 12, in other embodiments, selected ones of enumerated elements 14–33 may be disposed off motherboard 12.

Figure 2:
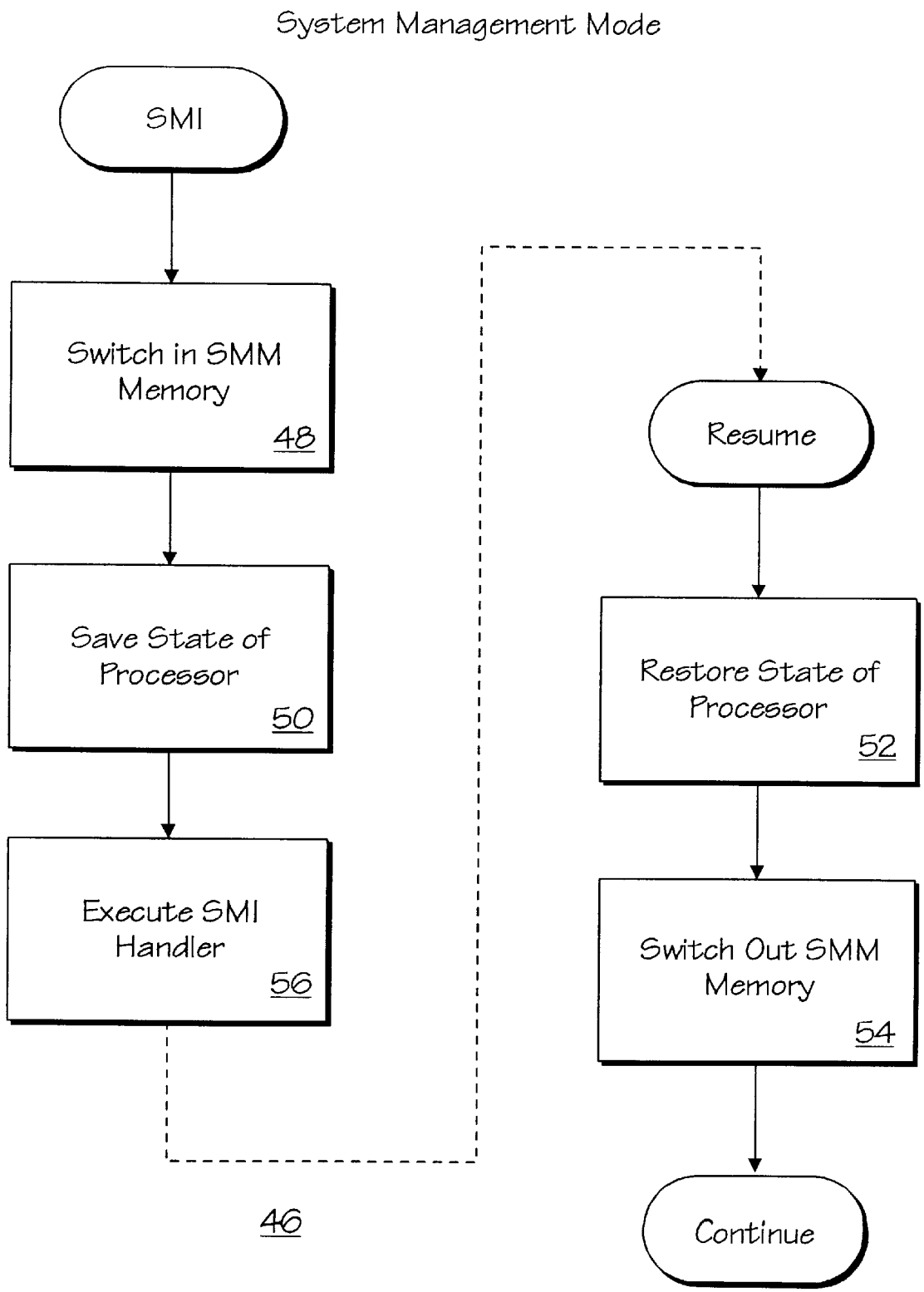
FIG. 2 illustrates one embodiment of the method steps employed by exemplary computer system of FIG. 1 for handling transparent system interrupts.

With references to FIG. 2, the servicing of an SMI is hereby briefly described. As shown, upon detection of an SMI, processor 14 directs memory controller 20 to switch in and map SMM memory 24 as part of the main memory 22, and in response, memory controller 20 performs the requested switching and mapping accordingly, step 48. Next, CPU 14 saves the processor state into SMM memory 24, step 50. Upon saving the processor state, CPU 14 transfers execution control to the pre-stored SMI handler, step 56.

The SMI handler then determines the cause of the SMI and services the SMI accordingly. Upon servicing the SMI, the SMI handler executes a Resume instruction to transfer execution control back to the interrupted programs. In response, processor 14 restores the saved processor state in SMM memory 24, step 52. Furthermore, processor 14 directs memory controller 20 to unmap SMM memory 24 from main memory 22. In response, memory controller 20 performs the requested unmapping and switching accordingly, step 54.

As a result, the SMI is serviced in a manner that is transparent to the executing operating system, subsystems, as well as application programs. In other words, an SMI is a transparent system service interrupt. As will be explained in more detail, the present invention exploits the functions offered by the SMI and the SMM memory 24 to allow the SMI handler to bear the main burden for providing user interface multimedia parameter control that is independent of the operating system.

Figure 3:
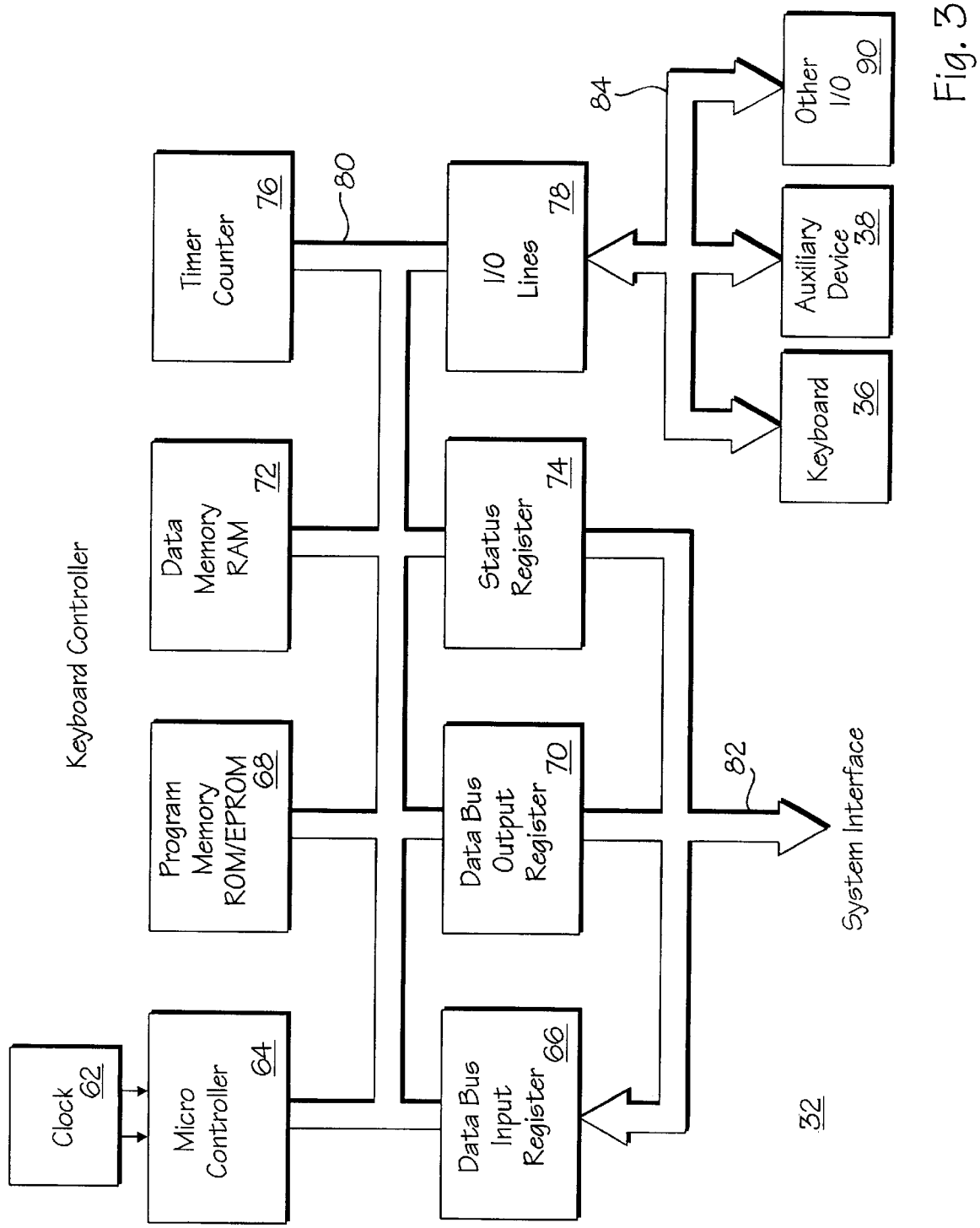
FIG. 3 illustrates one embodiment of the keyboard controller of FIG. 1.

Referring now to FIG. 3, wherein one embodiment of keyboard controller 32 of FIG. 1 is illustrated. As shown, keyboard controller 32 includes clock 62, micro controller 64, read only memory 68, random access memory 72 and bus 80 coupled to each other as shown. Additionally, keyboard controller 32 also includes data bus input register 66, data bus output register 70, and status register 74, coupled to bus 80 and interface 82 as shown. Furthermore, keyboard controller 32 includes timer counter 76 and I/O lines 78 coupled to bus 80 as shown. Keyboard 36 and auxiliary device 38 are coupled to I/O lines 78 through interface 84. Collectively, data bus input register 66, data bus output register 70, and status register 74 are also referred to as the "system port", whereas I/O lines 78 are also referred to as the "device port".

Microcontroller 64 controls the operation of keyboard controller 32, executing controller firmware incorporated with the teachings of the present invention. In particular, the firmware implements a plurality of commands supported by keyboard controller 32. For the most part, these commands are the commands required to be compatible with what's known in the art as the standard IBM® PS/2 Keyboard Controller commands. In one embodiment, these commands include a first command to increase the audio volume, a second command to decrease the audio volume, and a third command to mute the audio output generated through playback device 44. In alternative embodiments, additional commands could include commands to further adjust audio output and/or to adjust the brightness and/or contrast of an image generated on the display 42.

As will be described in more detail below, in accordance with the present invention, the controller firmware implements this support by causing keyboard controller 32 to trigger a SMI when a specified sequence had been entered by a user on the keyboard. The controller firmware is pre-loaded in read only memory 68. Random access memory 72 is used to store various operational data. I/O lines 76 are used to transfer commands/status and data to/from the connected devices, which include keyboard 36 and auxiliary device 38. Data bus input and output registers 66 and 70, and status register 74 are used to transfer commands/status and data from/to processor 14.

As will be apparent from the description to follow, keyboard controller 32 having the requisite controller firmware in accordance with the present invention may be implemented with any number of well known "programmable" keyboard controllers, including but not limited to the 8042 keyboard controller manufactured by Intel Corp. of Santa Clara, Calif., assignee of the present invention.

As a result, the main burden for providing multimedia parameter control is borne by the SMI handler, requiring only minimal multimedia parameter controller firmware functions to be required of keyboard controller 32, thereby substantially lowering the cost of keyboard controller 32 and providing user interface multimedia parameter control that is independent of the operating system. Furthermore, since the functions supported by the SMI handler are a lot easier to extend, the multimedia features supported can also be more easily extended.

Figure 4:
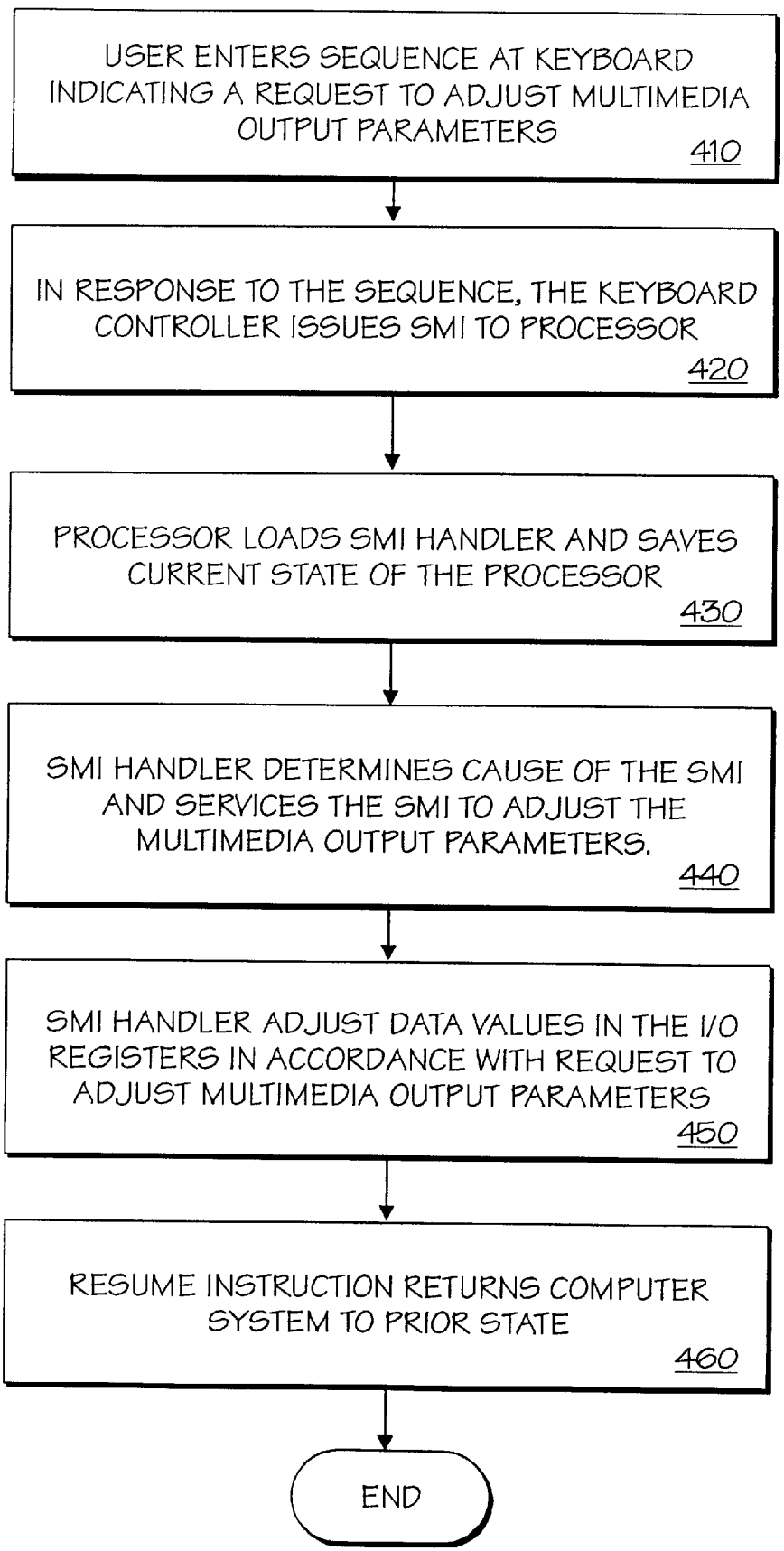
FIG. 4 illustrates a block diagram of the steps of one embodiment in the present invention for providing a user with control of multimedia output parameters throughout the use of transparent system interrupts.

FIG. 4 is a block diagram of the steps employed by the computer system to provide user interface control of multimedia output parameters through the use of the transparent system interrupts. In block 410, the user generates a sequence on the keyboard 36. The firmware of the keyboard controller 32 is programmed to trap specific sequences indicating a request to adjust the output of multimedia parameters. In one embodiment, three sequences provide control of audio volume. To increase the audio volume, the user enters the key sequence Cntrl+Alt.+Up Arrow. To decrease the audio volume, the user enters the key sequence Cntrl+Alt.+Down Arrow. To mute the audio volume, the user enters the key sequence Cntrl+Alt.+Home. As previously stated, alternative embodiments may implement other sequences to control the audio volume, and/or video images.

In block 420, the firmware of the keyboard controller 32 detects one of the above identified sequences and buffers the sequence in the random access memory 72. In addition, the keyboard controller 32 issues an SMI to the processor 14.

In block 430, when the processor 14 detects the SMI, the processor 14 loads the SMI handler and saves the current state of the processor 14 as previously discussed.

In block 440, the SMI handler determines the cause of the SMI and services the SMI accordingly. In one embodiment, servicing the SMI involves querying the keyboard controller 32 to detect the key sequence that caused the SMI. After determining the desired function as indicated by the key sequence, the SMI handler will determine the appropriate course of action specified by the sequence. The SMI handler will then perform the course of action specified.

In block 450, the SMI handler performs the action specified by the entered key sequence. More specifically, the SMI handler will read the configuration manager 33*a* of the CoDec 33 to determine the value of data stored in the I/O registers 33*b,* which represents the present multimedia output parameters. For example, the data in I/O registers 33*b* may represent the level of volume generated by the playback device 44 or the level of brightness of an image generated by display 42. The SMI handler will then have the respective data either increased or decreased in accordance with the request to adjust the output of multimedia parameters. For example, consider a request entered to decrease the volume of the audio output by two levels (i.e., entering Cntrl+Alt.+Down Arrow twice), wherein data stored in the I/O registers 33*b* indicates a present volume level of "8". As a result, the SMI handler will have the processor 14 decrease the value to "6" and write the new value to the I/O registers 33*b*. In response, the CoDec will provide the new value to the playback device 44, which will generate a lower volume.

In block 460, a resume instruction (RSM) is provided for returning the computer system 10 to the state just before the SMI was detected and resuming execution at the next instruction of any program interrupted by the SMI.

From the above description, it will be apparent that the invention disclosed herein provides a novel and advantageous method and apparatus of providing a user with control of multimedia output parameters, wherein the control is implemented on existing computer hardware architecture and is transparent of the operating system. As will be understood by those familiar with the art, the invention may be embodied in other specific forms without departing from its essential features, and thus, the described embodiments are not restrictive of the scope of the invention. The following claims are indicative of the scope of the invention, and all variations which come within the meaning and range of equivalency of the claims are to be embraced within their scope.

What is claimed is:

1. A computer system comprising:

a central processing unit (CPU);

a keyboard controller coupled to said CPU, said controller capable of detecting a multimedia parameter control requests and in response issuing a transparent system interrupt to said CPU; and an interrupt processing logic coupled to said CPU, said logic operable independent of an operating system, and, in response to said interrupt, said logic modifying multimedia parameters corresponding to said multimedia parameter control request, and said CPU, in response to said interrupt, stores data representing a present status of execution and transfers execution control to said interrupt processing logic.

2. The computer system of claim 1, wherein said computer system operates in a system management mode when said execution control is transferred to said interrupt processing logic.

3. The computer system of claim 1, wherein said multimedia parameters include audio data.

4. The computer system of claim 3, wherein said multimedia parameters further includes video or graphical data.

5. The computer systems of claim 4, wherein said controller detects said multimedia parameter control request in response to a predetermined keystroke sequence.

6. A computer system comprising:

a central processing unit (CPU);

a keyboard input means coupled to said CPU, said input means capable of detecting a multimedia parameter control requests and in response issuing a transparent system interrupt to said CPU; and an interrupt processing means coupled to said CPU, said interrupt processing means operable independent of an operating system, and, in response to said transparent system interrupt, said interrupt processing means modifying multimedia parameters corresponding to said multimedia parameter control request, said CPU, in response to said interrupt stores data representing a present status of execution and transfers execution control to said interrupt processing means.

7. The computer system of claim 6, wherein said computer system operates in a system management mode when said execution control is transferred to said interrupt processing means.

8. The computer system of claim 6, wherein said multimedia parameters include audio data.

9. The computer system of claim 8, wherein said multimedia parameters further includes video or graphical data.

10. The computer systems of claim 9, wherein said input means detects said multimedia parameter control request in response to a predetermined keystroke sequence.

11. A computer implemented method comprising the steps of:

entering a multimedia parameter control request via a keyboard;

in response to said multimedia parameter control requests, issuing a transparent system interrupt;

in response to said transparent system interrupt, modifying, via an interrupt processing logic, multimedia parameters corresponding to said multimedia parameter control request, said interrupt processing logic being operable independent of an operating system; and said CPU, in response to said interrupt, storing data representing a present status of execution and transferring execution control to said interrupt processing logic.

12. The method of claim 11, wherein said computer operates in a system management mode when said execution control is transferred to said interrupt processing means.

13. The method of claim 11, wherein said multimedia parameters include audio data.

14. The method of claim 13, wherein said multi-media parameters further includes video or graphical data.

* * * * *

UNITED STATES PATENT AND TRADEMARK OFFICE
CERTIFICATE OF CORRECTION

PATENT NO. : 6,125,236
DATED : September 26, 2000
INVENTOR(S) : Nagaraj et al.

It is certified that error appears in the above-identified patent and that said Letters Patent is hereby corrected as shown below:

On the title page,
    In item [57] please delete "Rayi" and replace with --Ravi--.
    In column 1, at line 21, delete "hl" and insert --In--.

Signed and Sealed this

Eighth Day of May, 2001

*Attest:*

NICHOLAS P. GODICI

*Attesting Officer*      *Acting Director of the United States Patent and Trademark Office*